United States Patent [19]

Miller et al.

[11] 4,171,667
[45] Oct. 23, 1979

[54] POPCORN VENDING APPARATUS

[75] Inventors: Kenneth H. Miller; Ramon W. Wilks, both of Austin, Tex.

[73] Assignee: Laredo Systems, Inc., Cleburne, Tex.

[21] Appl. No.: 745,174

[22] Filed: Nov. 26, 1976

[51] Int. Cl.² .............................................. A23L 1/18
[52] U.S. Cl. ................................ 99/323.6; 99/323.7; 99/323.8; 99/323.9; 221/254; 222/361
[58] Field of Search .......................... 99/323.4–323.9; 222/162, 361, 356; 221/263, 264, 254, 12, 96

[56] References Cited

U.S. PATENT DOCUMENTS

| 502,895 | 8/1893 | Van Norman | 221/254 |
| 807,281 | 12/1905 | Keller | 221/254 |
| 1,808,758 | 6/1931 | Bettandorff | 99/323.7 |
| 2,382,369 | 8/1945 | Smith | 222/361 |
| 2,630,058 | 3/1953 | Hawks | 99/323.6 |
| 2,726,026 | 12/1955 | Gould et al. | 221/96 |
| 2,939,379 | 6/1960 | Schmitt | 99/323.8 |
| 3,097,759 | 7/1963 | Jett | 222/162 |
| 3,253,532 | 5/1966 | Jones | 99/323.6 |
| 3,294,546 | 12/1966 | Fingerhut | 99/323.7 |

Primary Examiner—Harvey C. Hornsby
Assistant Examiner—Timothy F. Simone
Attorney, Agent, or Firm—Kenneth R. Glaser

[57] ABSTRACT

Disclosed is popcorn vending apparatus including a hot air cooker assembly, an elevator type supply assembly for furnishing raw kernels to the cooker, a cup dispenser, a dispenser including a pump for withdrawing butter flavoring from its original container and dispensing to the vended container of popcorn, and a salt dispenser for delivering tubes of salt to the purchaser. The cooker includes a transparent receptacle tiltable from a cooking position to a dispensing position; and a chute assembly for delivering both the cups and cooked popcorn to a delivery station includes means for preventing unauthorized access to the interior of the apparatus housing.

13 Claims, 12 Drawing Figures

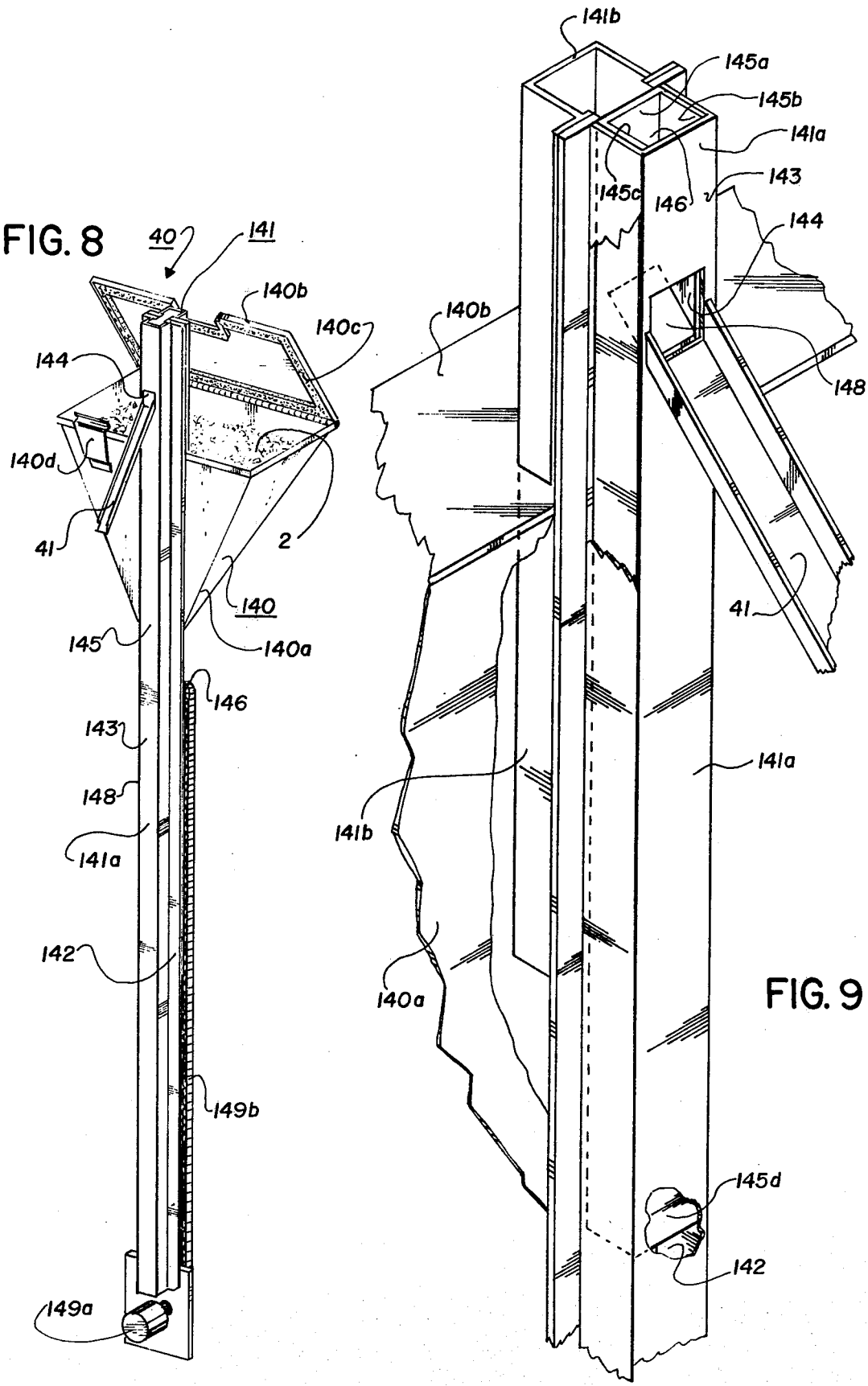

POPCORN VENDING APPARATUS

This invention pertains to popcorn vending apparatus, more particularly to apparatus for vending cups of popcorn freshly cooked by a hot air process, and even more particularly to vending apparatus incorporating uniquely designed assemblies for cooking popcorn and dispensing flavoring and condiments for such popcorn.

There are many situations where it is desirable to vend containers of popcorn under circumstances which make it inconvenient or impractical to employ an attendant to prepare and sell the popcorn to the public. As a consequence, various types of coin operated vending apparatus have been designed for use in theaters, stores, and other facilities which automatically dispense boxes or bags of popcorn at virtually any time of the day. The principal disadvantage of apparatus presently available, however, is that the popcorn is typically prepared long in advance of when it actually is dispensed, thus resulting in customers often receiving containers of stale popcorn. To overcome this disadvantage, various attempts have been made to design popcorn vending apparatus which actually cook the popcorn just prior to its being vended to the particular purchaser; but, to date, such apparatus have not been entirely satisfactory for all conditions of service.

It is therefore a principal object of the present invention to provide new and improved popcorn vending apparatus.

It is a further object of the invention to provide new and improved popcorn vending apparatus which not only cooks the popcorn at the time it is to be dispensed, but also supplies desired flavoring and condiments for use with the vended popcorn.

It is a still further object of the invention to provide new and improved popcorn vending apparatus which utilizes a hot air method of cooking the popcorn enabling not only the dispensing of freshly cooked popcorn each time, but also providing an attractive and delectable display of the popcorn as it is being cooked.

It is another object of the invention to provide new and improved cooker, kernel corn supply, flavor dispenser, and salt dispenser assemblies which have utility, in of themselves, as well as in popcorn vending apparatus.

In accordance with these and other objects, the popcorn vending apparatus of the present invention includes a transparent cooker assembly utilizing heated air for converting raw kernel corn into "popped" corn; an elevator-type supply assembly for delivering precise portions of the raw kernel corn to the cooker assembly; a cup dispenser assembly for supplying individual cups to be filled with the popped corn dispensed from the cooker assembly; a flavor dispenser assembly for dispensing butter flavored fluid topping to the vended box of popcorn; and a salt dispenser assembly for delivering individual tubular packages of salt to the purchaser of the popcorn. The aforementioned assemblies are sequentially operated in response to the insertion of coins in the apparatus and are disposed within an enclosed enviromentally controlled housing having means for preventing unauthorized access to the interior of such housing.

Additional specific features of the apparatus and of the various component assemblies, as well as other objects and advantages of the invention, will become more readily understood from the following detailed description, taken in conjunction with the attached drawings, wherein:

FIGS. 8-10 are pictorial views of the kernel corn supply assembly with portions of the assembly being broken away for clarity of illustration of the features and operation thereof.

The drawings are not necessarily to scale and in some instances portions have been exaggerated for clarity of illustration and description.

Figure 1:
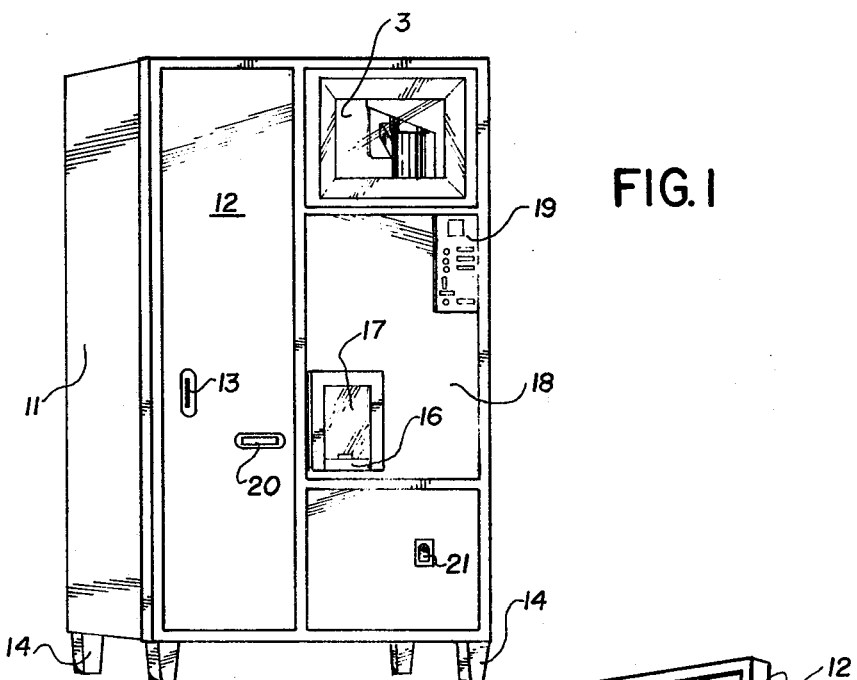
FIG. 1 is a perspective view of the housing for the popcorn vending apparatus of the present invention with the front door thereof being closed.
Figure 2:
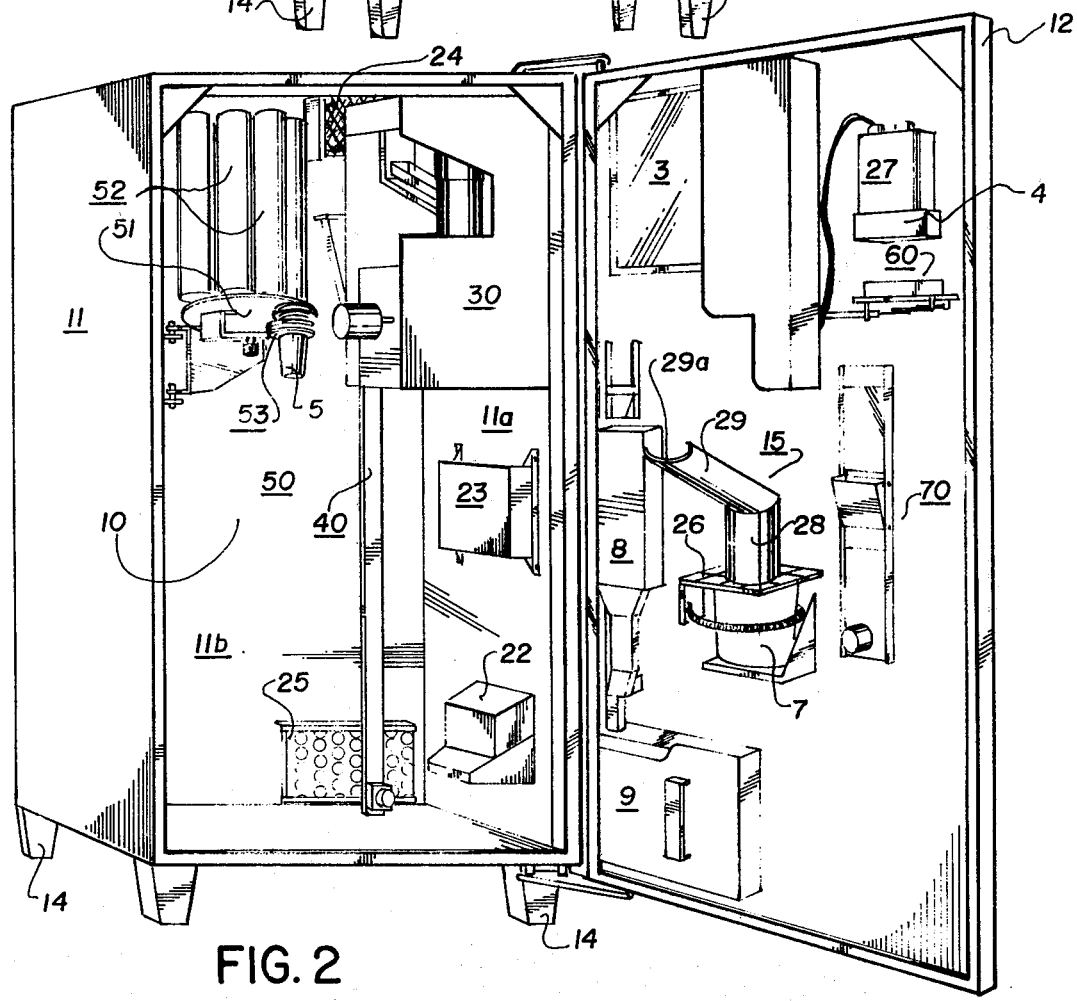
FIG. 2 is a perspective view of the interior of the housing depicted in FIG. 1 with the front door in an open position.

Referring initially to FIGS. 1 and 2, the popcorn vending apparatus of the present invention includes a main enclosure 11 having a front door 12 swingably mounted therewith for respectively enabling and closing off access to the interior 10 of the enclosure. The enclosure 11 is preferably supported by legs 14, and a conventional locking mechanism 13 is provided to secure the door in its closed position (FIG. 1).

As depicted in FIG. 2, and in accordance with a preferred form of arrangement, disposed within the interior 10 of the enclosure 11 is a cooker assembly 30 for converting raw kernel corn into "popped" corn; a kernel corn supply assembly 40 for delivering measured quantities of the raw kernel corn to the cooker assembly 30; and a cup dispenser assembly 50 for supplying individual cups to be filled with the popped popcorn dispensed from the assembly 30.

Additionally, a housing 22 containing a cam timer mechanism for controlling the overall sequential operating cycle (subsequently described) of the popcorn vending apparatus and a housing 23 containing a solid state heat controller for maintaining the heat required by the cooker assembly are attached to side wall 11a of the enclosure 11 with a fan 24 and louver-filter assembly 25 located in the rear wall 11b providing ventilation of the interior 10.

A delivery chute assembly 15 is mounted with the door 12 and includes a delivery chute defined by a lower semicircular portion 28 and an inclined upper arcuate portion 29. The inclined chute portion 29 is of such size and orientation that when the front door 12 is closed, its end 29a is positioned to receive both cups 5 dropping from the dispenser assembly 50 and cooked popcorn expelled from the cooker assembly 30. Thus, and as subsequently described in greater detail, both a cup and the popcorn deposited in the cup are constrained to move along the same delivery path, i.e., down the inclined chute portion 29 to the delivery opening 16 (FIG. 1) in front of and adjacent portion 28.

A platform 26 is disposed immediately below the delivery chute assembly 15 for supporting the cup 5 (and its vended contents) at the delivery opening 16. Preferably the platform is grated to allow excess or overflow popcorn to fall through to a waste can 7 supported underneath. Additionally, a transparent door 17 slidably mounted in the front panel 18 of the door 12 enables access to the delivery opening 16 in order to retrieve the vended box of popcorn therefrom.

Figure 2A:
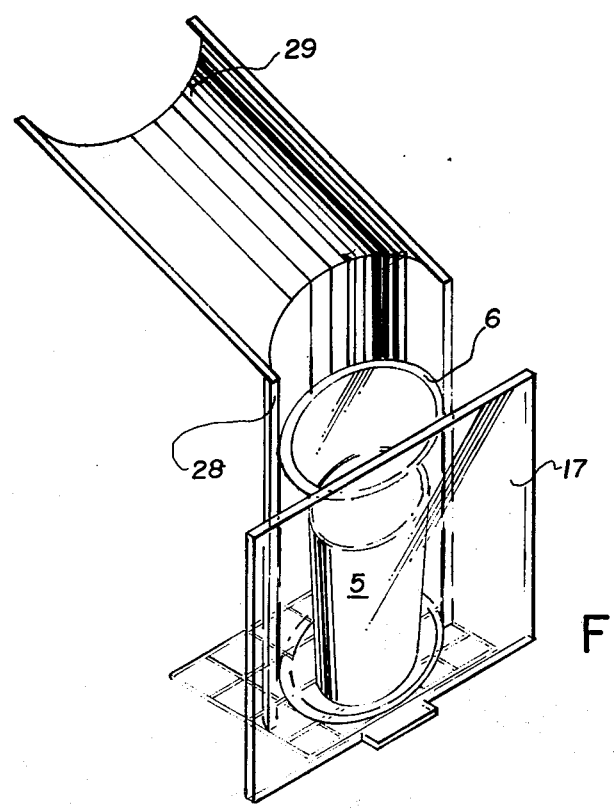
FIGS. 2a and 2b are illustrations of that portion of the vending apparatus specifically depicting the delivery chute assembly at the location where the vended cup of popcorn is retrieved, and particularly depicting means for preventing unauthorized access to the interior of the housing through the dispensing chute.
Figure 2B:
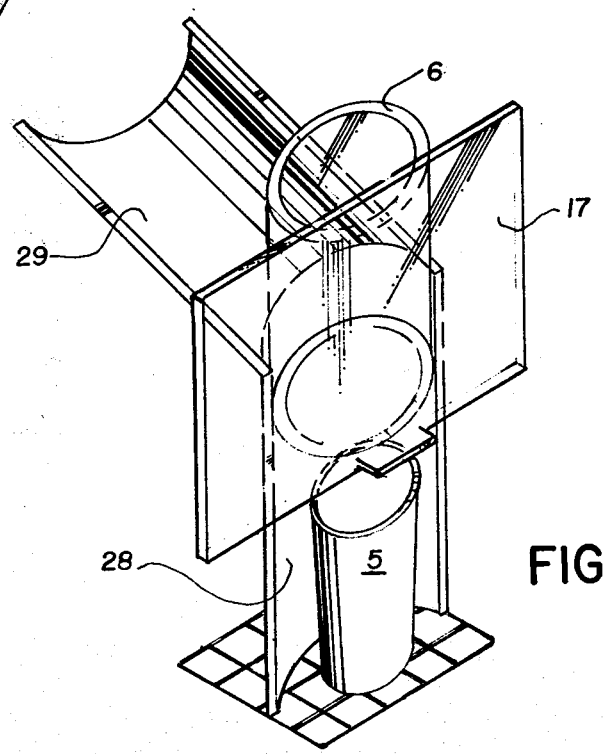

In accordance with a particular feature of the invention, and as best depicted in FIGS. 2a and 2b, a transparent cylindrically shaped sleeve 6 dimensioned to fit within the confines of the semicircular chute portion 28 is attached to the rear of door 17. The sleeve is of a sufficient diameter to enable a vended cup 5 to pass therethrough (from inclined chute 29) when the door 17 is closed (FIG. 2a). When the door 17 is raised to retrieve the cup of popcorn (position depicted in FIG. 2b), the sleeve 6 is correspondingly elevated a sufficient distance not only to enable removal of the cup, but also to block the passageway to chute 29, thus preventing unauthorized access to the interior of enclosure 11 through opening 16.

A flavor dispenser assembly 60 for dispensing butter flavored fluid topping to the cup of popcorn vended in the opening 16 and a salt dispenser assembly 70 for delivering individual packages of salt to a dispensing opening 20 (FIG. 1) are also mounted at the inside of front door 12. As subsequently described in greater detail, the flavor dispenser assembly 60 extracts the fluid topping from its original container 27 which is supported on the door by a bracket 4. A conventional coin control mechanism 8 and coin receipt box 9 are also mounted inside the door 12 with plate 19 containing the conventional coin slot, product selection and coin return buttons accessible at the front of the housing, along with coin return slot 21.

To enable observation by the purchaser of the popcorn being "popped", a unique feature and advantage of the hereindisclosed apparatus, a transparent window 3 is positioned in the front panel 18 of the door directly in front of the cooker assembly 30.

Having briefly explained the function and preferred mounting arrangement of the respective component assemblies of the popcorn vending apparatus of the present invention, the specific details and operation of the assemblies are now described:

Cup Dispenser Assembly

Referring again to FIG. 2, the cup dispenser assembly 50 is patterned after dispenser assemblies presently known in the art and comprises a rotatably mounted turret subassembly 51 having a plurality of cylinders 52 each containing a large quantity of stacked cups therein. In operation, one of the cylinders 52 is initially positioned over a dispenser mechanism 53 which is effective to releasably retain the bottom cup of the cylinder and, upon command, release that cup to allow it to drop onto the chute 29 positioned underneath. Thus, the assembly 50 is effective to dispense a single cup 5 from one of the cylinders 52 each time a vend cycle is initiated and to rotatably position a new cylinder 52 over the dispenser mechanism 53 whenever the supply of cups in an adjacent cylinder is exhausted.

Cooker Assembly

Figure 3:
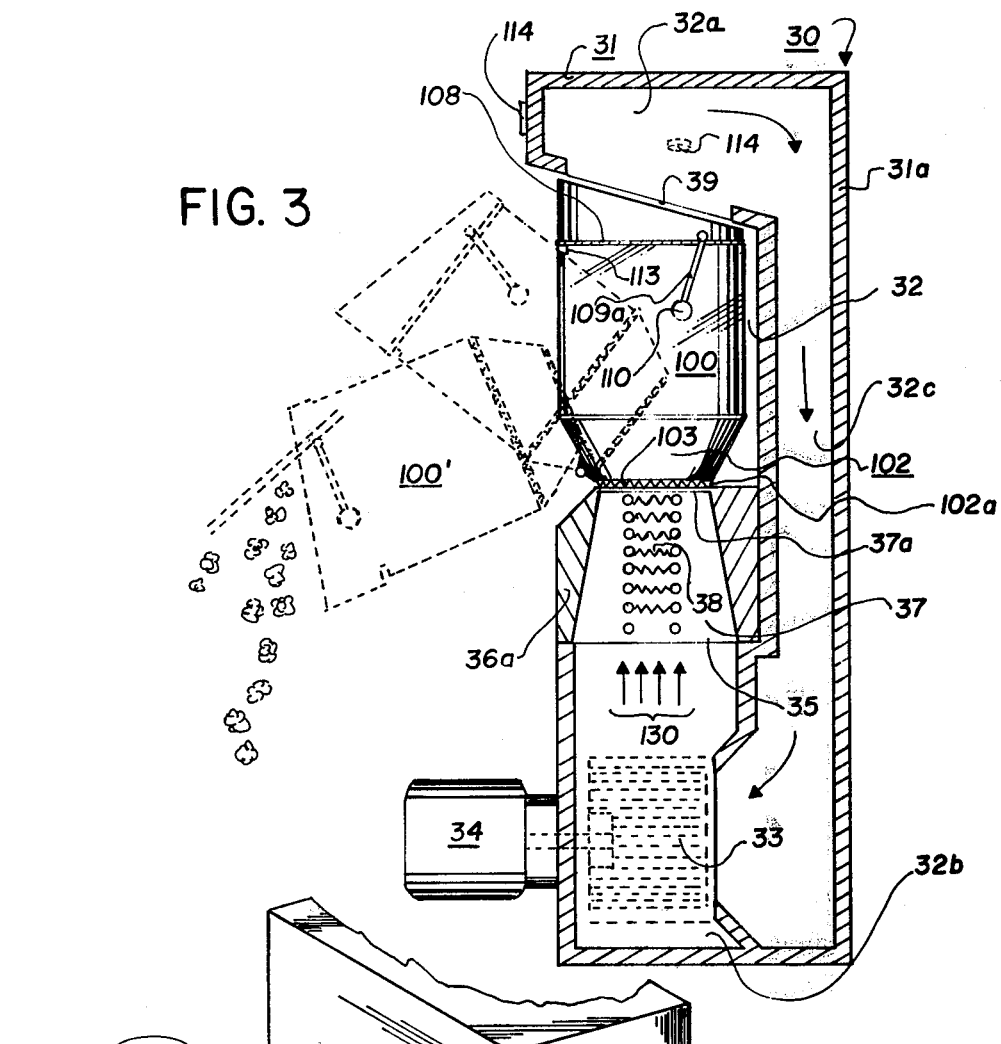
FIG. 3 is a side elevational view, partially in schematic and partially in cross-section, illustrating the features and operation of the cooker assembly.
Figure 4:
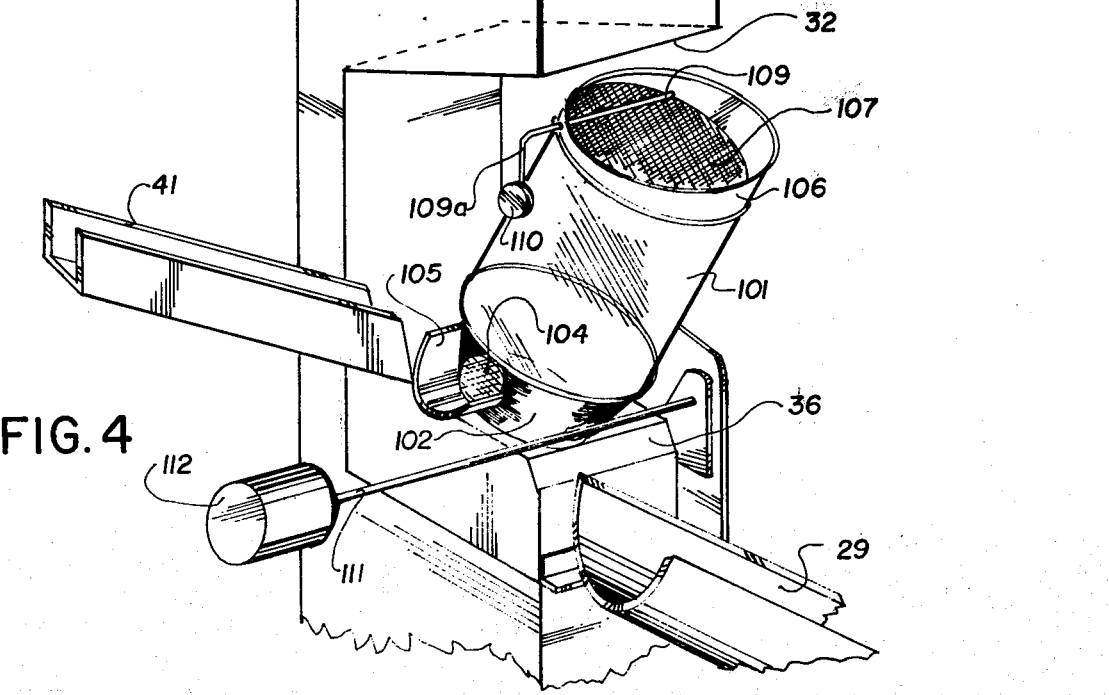
FIG. 4 is a pictorial view of the front and side of the cooker assembly.

Referring now to FIGS. 3 and 4, there is now described the details of the cooker assembly 30. Accordingly, the assembly includes a main housing 31 having a peripheral insulated wall 31a defining respective upper and lower compartments 32a and 32b in flow communication with one another by way of a vertically extending chamber 32c. Mounted within the lower compartment 32b is a fan (diagrammatically depicted as 33) driven by a motor 34, the fan being effective to direct air in the direction illustrated by arrows 130.

Disposed above the lower portion of main housing 31 (defining chamber 32b) is a heater housing 36 having an insulated peripheral wall 36a defining a chamber 37 in which is disposed an electrical heating assembly 38. The chambers 32b and 37 are in flow communication with one another by way of opening 35 so that air exiting the chamber 32b passes into the chamber 37 and flows past the coils of the electrical heating assembly 38 and thereafter exits the chamber 37 through an opening 37a at the top thereof.

Suspended within the recess 32 intermediate the top of housing 31 and heater housing 36 is a receptacle 100 in which the raw kernel corn is to be cooked or "popped". This receptacle, the details of which are subsequently described, is open at the top and bottom thereof so that air exiting the opening 37a of the heater chamber 37 passes through the receptacle and thereafter through an opening 39 into the compartment 32a. Thus, and as best depicted in FIG. 3, air is forced (by fan 33) past the heater assembly 38, the heated air passing through the receptacle 100 into the upper chamber 32a of the housing 31 where it returns by way of chamber 32c to compartment 32b where it is again recirculated by the fan, the total air flow being depicted by the arrows in FIG. 3.

The receptacle 100 consists of a cylindrically shaped transparent globe 101 retained by a metallic base portion 102. The globe is preferably constructed of a material, such as Pyrex, having a high heat resistance. Extending across the bottom opening 102a of the base 102 is a stainless steel mesh screen 103 for supporting the raw uncooked kernels which are injected into the receptacle 100 (from supply assembly 40) through an inlet 104 in the base 102. As depicted in FIG. 4, an inclined trough 105 is secured to the base 102 at the inlet 104 and when the receptacle is in its upright position (solid line depiction of FIG. 3), conveys the kernel corn from the corn chute 41 through the opening 104 onto the screen 103.

Disposed around the top of the globe 101 is a metallic collar 106 which supports another mesh screen 107 extending across the top opening 108 of the globe. In accordance with a unique feature thereof, the screen 107 is pivotally mounted by way of shaft 109 to the collar 106 to rotate between a closed position when the receptacle 100 is upright and an open position when the receptacle 100 is in a tilted position (depicted by the dotted lines in FIG. 3 and referenced as 100'). To facilitate this pivotal action, the shaft 109 (which is rigidly secured to the screen 107 at the location shown in FIG. 4) has an end portion 109a bent at a substantially 90 degree angle with a weight 110 secured to the end thereof. Thus, and as illustrated in the "motion picture" of FIG. 3, the weighted end 109a not only aids in retaining the screen closed (against lip 113) when the receptacle 100 is upright, but facilitates the pivotal opening of screen 107 when the receptacle is completely tilted.

The entire receptacle 100 is suspended over the heater housing 36 immediately adjacent the electrical heater 38 by a rod 111 secured to the base portion 102. The end of the rod 111 is coupled to the shaft of a reversible motor 112 which is therefore effective, upon command, to rotate the entire receptacle between its upright position and its fully tilted position (depicted as 100') with limit switches (not shown) reversing the motor after the receptacle has reached its tilted position (and the popcorn contents spilled onto delivery chute 29) and turning off the motor after the receptacle has returned to its original upright position.

In accordance with the operation of the cooker assembly 30, a measured quantity of raw uncooked kernel corn is deposited within the receptacle 100 upon the bottom screen 103. The heated air entering from the chamber 37 "cooks" these kernels resulting in the familiar "popped" popcorn being suspended by the air stream passing through the receptacle with the top screen 107 retaining the popcorn therein. Since the globe 101 is transparent, the purchaser can actually observe his popcorn being cooked through the transparent window 3 in the front door.

In order to insure requisite feeding of the air flowing into the container 100, a sensor 114 monitors the temperature of the hot air and, in combination with the controller within the housing 23, regulates the heat supplied by the electrical heating assembly 38. For convenience, a thermometer 114 may be located at the top of the housing 31 to indicate the temperature of the hot air flowing through the assembly. The time required to completely cook the raw kernels is determined by a timer associated with the timing mechanism located within the housing 22.

After completion of the cooking cycle, the motor 112 is actuated to rotate the receptacle 100 to its fully tilted position, thereby allowing the cooked popcorn to spill out of the container onto the delivery chute portion 28. Thereafter, the motor 112 reverses and returns the receptacle to its initial upright position for the next vend cycle.

Flavor Dispenser Assembly

Figure 5:
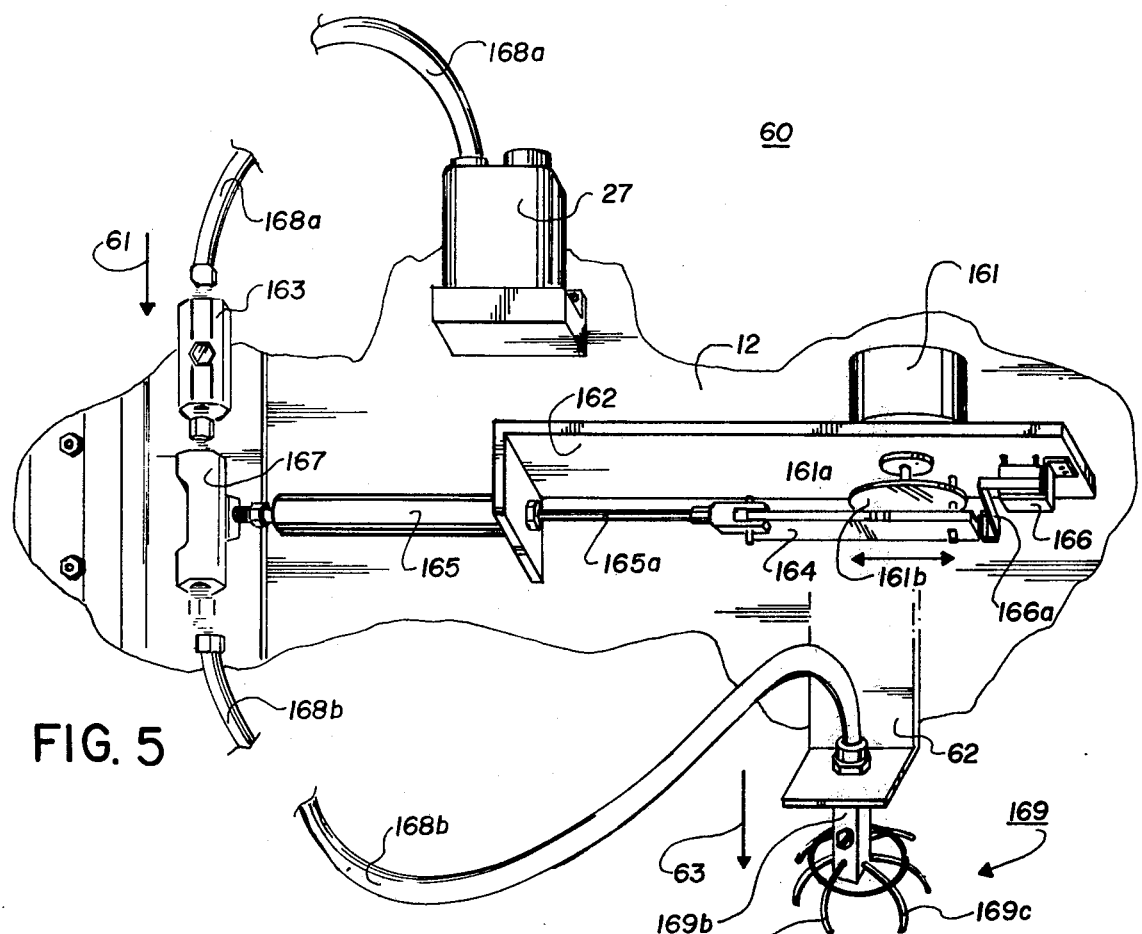
FIG. 5 is a pictorial view of the pertinent portions of the flavor dispenser assembly.

Referring now to FIG. 5, the flavor dispenser assembly 60 of the present invention is now described. Accordingly, a mounting plate 162 secured to the inside of door 12 mountably supports a gear motor 161 having its rotatably driven drive shaft 161a extending through the plate 162 and affixed at its end to the center of a disc 161b. A crank arm 164 is eccentrically mounted adjacent the periphery of the disc 161b so that rotation of the disc (by motor 161) reciprocates the crank arm in the direction indicated by the arrow. A piston type pump 165 is mounted to plate 162 and has its piston rod 165a pivotally coupled with the crank arm 164 so that the reciprocation of the crank arm causes a corresponding reciprocation of the piston rod within the cylindrical housing of the pump 165. A limit switch 166 is suspended from plate 162 and is so positioned with respect to the crank arm 164, that reciprocation of the crank arm to its rightmost position depresses the switch lever 166a to deactuate motor 161.

The internal chamber of pump 165 is in fluid communication with flexible conduits 168a and 168b by way of a channeled T-shaped fitting 167, a check valve 163 disposed intermediate the conduit 168a and fitting 167 to allow fluid flow only in the direction of the arrow 61.

The open end of the conduit 168a is inserted within the container 27 of butter flavored fluid topping; and the end of conduit 168b extends, in fluid communication, with a dispensing head 169. The dispensing head would be mounted (by bracket 62) over the delivery opening 16 in which the vended cup of popcorn is situated, and comprises a check valve 169b in fluid communication with a plurality of open-ended downwardly directed tubes 169c. The check valve 169b assures flow of the fluid topping through the dispensing head in the direction of arrow 63 where it is then diverted by tubes 169c into multiple streams of butter flavoring ejected onto the popcorn.

In accordance with the operation of the flavor dispenser assembly 60, and during a particular vend cycle, actuation of the motor 161 rotates the disc 161b to reciprocate the crank arm 164 (and piston rod 165a) to the leftmost position, butter flavored fluid topping within the chamber of pump 165 (from the previous cycle) thereby being ejected by way of conduit 168b and dispensing head 169 to the popcorn within the cup 5. Continued rotation of the disc 161b will then reciprocate the piston rod 165a to the rightmost position, thereby withdrawing, by suction, a new supply of topping from the container 27 into the pump chamber. The reciprocation of the crank arm 164 to its rightmost position depresses the limit switch lever 166a, deactuating motor 161; and the dispenser assembly is now ready for the next cycle.

It is thus apparent that with the use of the flavor dispenser assembly 60, a precise amount of butter flavored topping may be dispensed to the vended popcorn from a supply of such topping conveniently maintained in its original container mounted with the door 12.

Salt Dispenser Assembly

Figure 6:
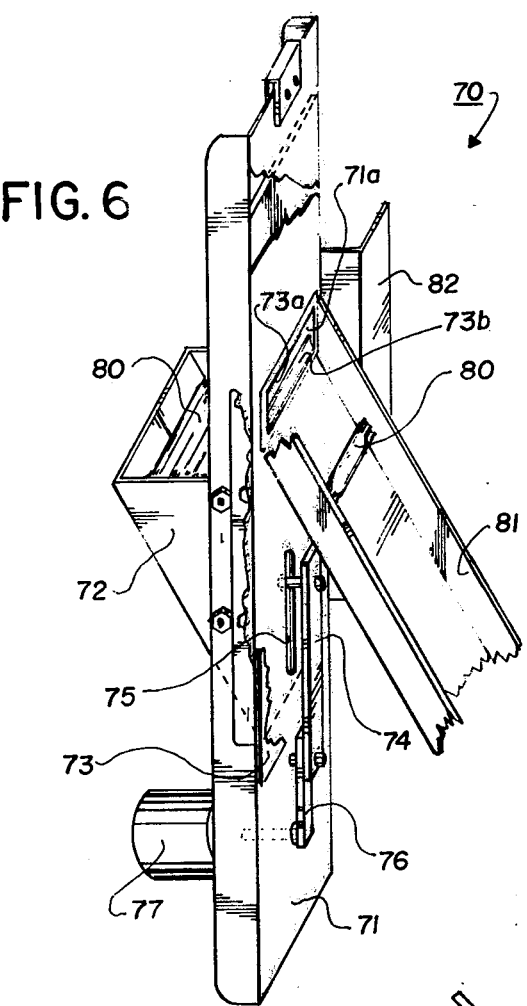
FIGS. 6 and 7 are pictorial views showing the details and operation of the salt dispenser assembly.
Figure 7:
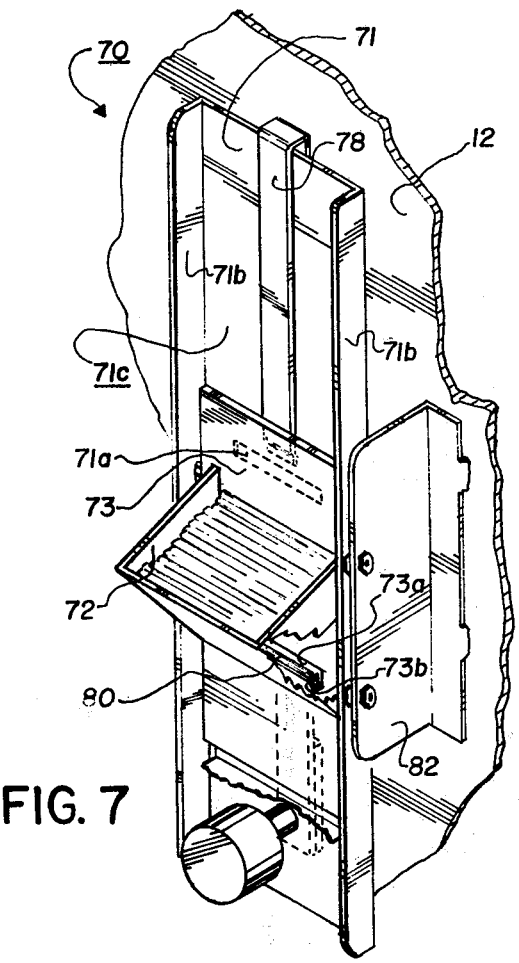

Referring now to FIGS. 6 and 7, the details and operation of the salt dispenser assembly 70 are now described. Accordingly, an elongated channel shaped housing 71 is suitably attached (by a pair of brackets 82) at the inside of the door 12. The housing has a transverse slot 71a therein which is in communication with the salt dispensing opening 20 in the door 12 (FIG. 1) by way of a delivery chute 81. An inclined hopper 72 is mounted with the housing 71 (along edges 71b) and is open toward the housing face 71c with the top of the hopper disposed slightly below the slot 71a. The hopper is filled with tubes of salt 80 which are urged, by gravity, toward the housing 71.

A plate 73 having a transverse slot 73a therein is mounted for slidable movement along, and in front of, face 71c of the housing 71 and is reciprocated between a "dispensing" position shown in FIG. 6 (with the slot 73a aligned with the housing slot 71a) and a "blocking" position depicted in FIG. 7 (with the plate obstructing the housing slot 71a). An upwardly inclined beveled edge 73b extends from plate 73 adjacent bottom of slot opening 73a.

The reciprocating translation of the plate 73 is effected by way of a crank arm 74 having one end connected to the plate 73 through longitudinal slot 75 and its opposed end eccentrically mounted (by way of linkage 76) to the shaft of a motor 77.

In accordance with the operation of the salt dispenser assembly 70, and assuming that the plate 73 is initially in its uppermost position, the actuation of the motor 77 first lowers and then elevates the plate 73 (and particularly the slot opening 73a) along the open side of hopper 72. As a result, one of the salt tubes 80 will be urged into the plate opening 73a, the beveled edge 73b facilitating the particular salt tube being captured within that slot (FIG. 7). In practice, the "capture" of a tube may either occur as the plate is being lowered or elevated past the open hopper.

As the plate 73 continues its upward travel, the slots 73a and 71a become aligned; and the tube of salt being carried within the plate opening falls through slot 71a to the chute 81 (FIG. 6) and thereafter to the dispensing opening 20 at the front of the apparatus. If desired, a spring biased leaf member 78 may be provided to assure clearance of each salt tube through the slot 71a.

Kernel Corn Supply Assembly

Figure 10:
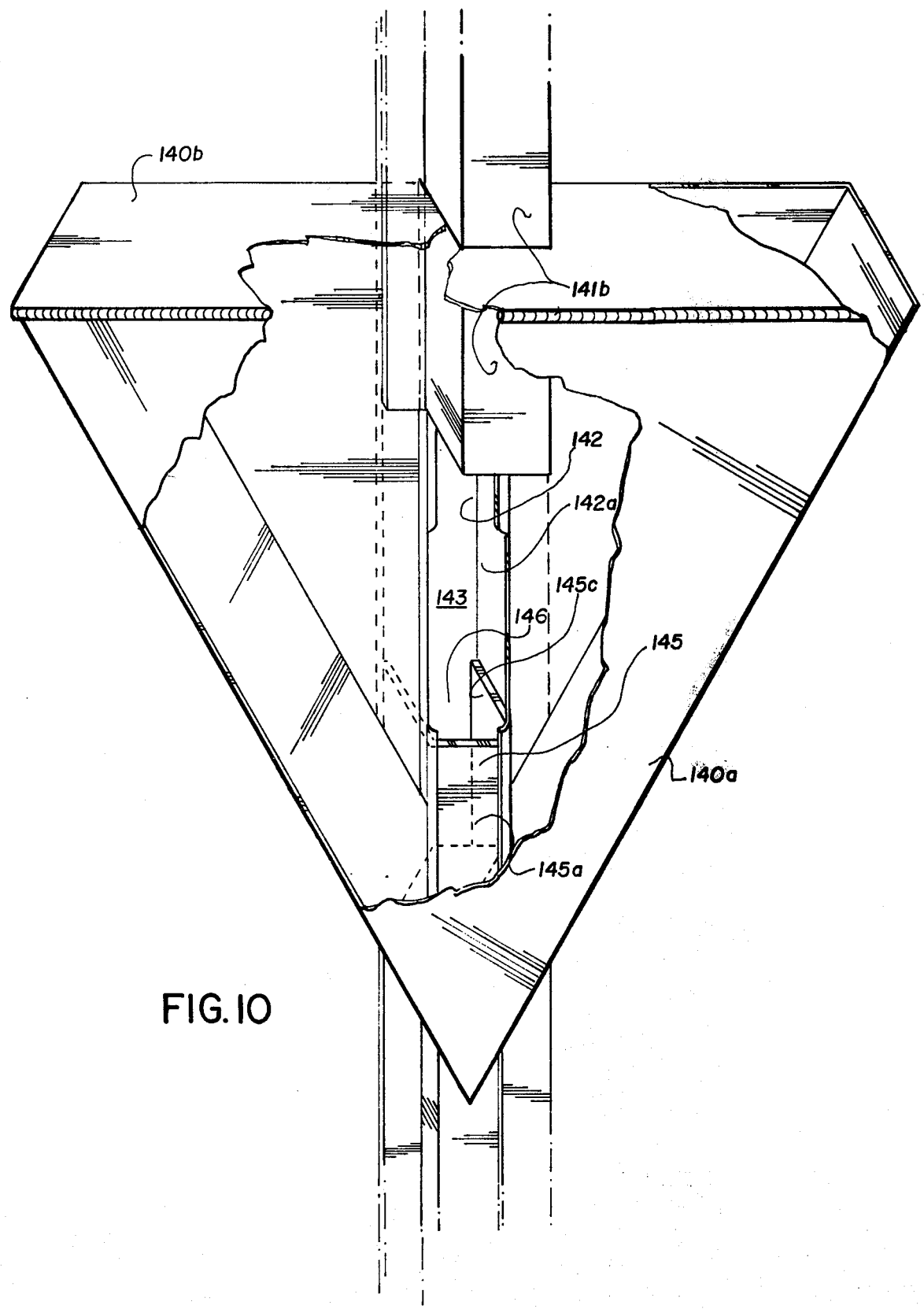

Referring now to FIGS. 8-10, there is now described the details and operation of the kernel corn supply assembly 40. Accordingly, the assembly comprises a hopper 140 for retaining a supply of kernel corn 2, from which selected portions are delivered (along corn chute 41) to the cooker assembly 30. The hopper 140 includes a main bin 140a and a pivotally mounted lid 140b having a peripheral seal 140c to prevent drying of the retained corn. A spring clip 140d assists in retaining the lid in its closed position.

The hopper 140 is suitably attached with a tube assembly 141 formed by a first elongated channel shaped tube 141a mounted with, but on the outside of, bin 140a and a second shorter channel shaped tube 141b extending into the interior of bin 140a. In accordance with a feature of this supply assembly, and for the reason subsequently described, the shorter tube 141b extends to a location near the bottom of bin 140a. It is to be understood that FIGS. 8 and 9 are illustrations of assembly 40 viewed from behind tube 141a looking toward hopper 140 while FIG. 10 is a view from the opposite direction looking "through" the hopper (with a portion of the rear wall removed for clarity).

The tube 141a defines a channel 142 therein extending for its entire length and this channel is in communication with the interior of bin 140a at the location below the shorter tube 141b (FIG. 10), and particularly at the wider throat portion 142a. It is thus apparent that kernels of uncooked corn stored within the hopper bin 140a can enter the channel 142 (when unobstructed) only at a location below the end of shorter tube 141b, the blocking of the channel by tube 141b above this location thus assuring that kernels from the bottom of the hopper (the older kernels) exit the hopper first. An exit opening 144 is also provided near the top of tube 141a (through elongated wall portion 143) and provides flow communication between channel 142 and corn chute 41.

Telescopically mounted within channel 142, and adapted for slidable translation along the walls of tube 141a, is an inner tube member 145 having rear wall 145a and side walls 145b and 145c extending its entire length. In addition, a front wall 145d extends upwardly to a location below the top of tube 145 with an inclined ramp portion 148 extending therefrom to intersect rear wall 145a, as best viewed in FIG. 9.

It is thus observed that a "cup" is defined at the top of tube 145 with three sides of the cup being provided by walls 145a, 145b, and 145c, the fourth side of the cup being provided by the wall portion 143 of tube 141a, and the bottom of the cup provided by ramp 148. The depth of the cup would be determined by the distance between top opening 146 and the ramp 148; and, if desired, the ramp 148 may be adjustably vertically mounted in order to vary this length.

The inner tube member 145 is raised and lowered within channel 142 by a motor-drive chain assembly 149a and 149b which reciprocates the inner tube between a lower "filling" position (FIG. 10) where the cup opening 146 is disposed below the base of tube 141b and an uppermost "dispensing" position (FIG. 9) where the cup has been advanced past the exit oppening 144.

In accordance with the operation of the kernel corn supply assembly 40, when the inner tube 145 is translated downward within the channel 142 to a location where the top of the tube passes below the bottom of tube 141b, kernel corn from the hopper will flow through the now unobstructed portion of the channel 142 into the top opening 146 of the tube 145. The inner tube continues to the lowermost position (depicted in FIG. 10), during which time the "cup" is filled with kernel corn. The subsequent elevation of the tube 145 past the base of member 141b then enables any excess corn to spill back into the hopper (particularly through enlarged throat 142a) with the result that a precise portion of corn which is to be dispensed to the cooker assembly is carried within the "cup" at top of tube 145. The continued elevation of tube 145 to the position depicted in FIG. 9 will then advance the so-transported portion of kernel corn into registry with the exit opening 144, the kernels spilling through this opening onto the chute 41 where they are then conveyed to the cooker assembly 30. It is apparent that the inclined ramp 148 assists in the discharge of the portion of kernels from tube 145.

In accordance with a preferred operation of the assembly, the tube 145 is initially positioned (from a prior vend cycle) below the base of member 141b. The motor 149a is then actuated during the particular vend cycle to elevate the tube (and therefore the portion of kernel corn) past the exit opening 144 until the entire contents within the "cup" have spilled onto the chute 41. A limit switch (not shown) then reverses the motor 149a, lowering the tube 145 to its lowermost position, another limit switch (not shown) again reversing the motor 149a to return the tube to the initial rest position ready for the next vend cycle. It is thus apparent that the assembly 40 is effective to remove a predetermined portion (defined by the dimension of the "cup") of kernel corn from the bottom of the supply of corn within the hopper, thereby assuring the freshness of the vended popcorn, and deliver this predetermined portion to the corn chute 41.

Overall Operation of Vending Apparatus

The overall operating cycle of the popcorn vending apparatus is initiated with the insertion of the coins at the front of the apparatus housing. While various control mechanisms known in the art may be employed to actuate the various assemblies in accordance with the sequential operation subsequently described, and the details and operation of the control mechanisms are therefore not critical to the present invention, one suitable mechanism may be a motor driven cam timer (disposed within housing 22) which, along with various switches, initiates and terminates the operation of each assembly at the appropriate time.

Accordingly, the motor driven cam timer mechanism is actuated in response to the receipt of the required number of coins by the coin control mechanism 8, the timer mechanism initially actuating motor 149a of the kernel corn supply assembly 40 to lift the predetermined portion of raw uncooked kernels to the supply chute 41 where it is delivered to the interior of the cooker assembly receptacle 100.

The cooker assembly is thereafter actuated to cook, by heated air, the kernels therein, thus producing in essence a fountain-like display of "popped" popcorn within the receptacle 100. At approximately the same time, a cup is dropped from the cup dispenser assembly 50 onto the chute 29 where it is conveyed to the delivery opening 16. The salt dispenser assembly 70 is normally actuated at this time to deliver a tube of salt to the slot 71a where it is dispensed by way of chute 81 to the salt dispensing opening 20 at the front of the housing.

After the requisite cooking time, the motor 112 of the cooker assembly 30 is actuated to tilt the receptacle 100 to a position where the cooked popcorn spills onto the chute 29 and thereon into the previously dispensed cup, the receptacle thereafter being returned to its initial upright position. The motor 161 of the flavor dispenser assembly 60 is then actuated to dispense the butter flavoring onto the popcorn within the cup; and the vending cycle is completed.

Various modifications to the disclosed embodiments, as well as alternate embodiments, of the present invention may become apparent to one skilled in the art without departing from the spirit and scope of the invention as defined by the appended claims.

What is claimed is:

1. Popcorn vending apparatus, comprising:
   (a) an enclosed housing provided by a main environmentally maintained enclosure and a door mounted with, and adapted to close off access to the interior of, said main enclosure;
   (b) cooker assembly means disposed within the interior of said main enclosure, said cooker assembly means comprising a receptacle for retaining popcorn kernels therein, means for directing heated air through said receptacle at said kernels to cause them to cook within said receptacle, and means for rotating said receptacle between a first upright position during the cooking of said kernels and a second tilted position to enable the dispensing of popped kernels by gravity from said receptacle;
   (c) kernel corn supply assembly means disposed within the interior of said main enclosure for storing a supply of unpopped popcorn kernels and delivering a selected quantity of said stored kernels to said receptacle of said cooker assembly;
   (d) cup dispenser assembly means disposed within the interior of said main enclosure for dispensing individual cups to be filled by said popped kernels;
   (e) delivery chute means for transporting cups from said cup dispenser assembly to a delivery station opening in said door as well as directly transporting popped kernels dispensed from said receptacle to a cup at said delivery station opening, said delivery chute means comprising a first arcuate shaped portion mounted at said door and aligned with said delivery station opening and a second contiguous inclined portion extending away from said door and so oriented with respect to said cup dispenser and cooker assemblies whereby when said door is closed, the said second contiguous inclined portion of the delivery chute is positioned to receive cups dropping from said cup dispenser assembly and popped kernels dropping from the cooker assembly receptacle when in its second tilted position, thereby to directly transport said received cups and popped kernels to said delivery station opening;
   (f) a supply of butter flavored fluid topping supported at said door;
   (g) flavor dispenser assembly means supported at said door for withdrawing a selected quantity of said topping and dispensing said selected quantity to a cup of popcorn at said delivery station opening;
   (h) salt dispenser assembly means supported at said door for delivering individual tubular packages of salt to a second opening within said door; and
   (i) control means initiating and terminating the sequential operation of said cooker assembly means, kernel corn supply assembly means, cup dispenser assembly means, flavor dispenser assembly means, and salt dispenser assembly means; said control means initiating the operation of said cup dispenser assembly to drop a cup onto the inclined portion of said delivery chute means and thereafter rotating the cooker assembly receptacle to its second tilted position to dispense the cooked and popped kernels to the inclined portion of said delivery chute, whereby said cooked and popped kernels are transported to said previously dispensed cup.

2. The apparatus as defined by claim 1 further comprising a door disposed in front of said delivery station opening and adapted to be opened to enable retrieval of a vended container of popped corn at said delivery station opening; and means associated with said door for blocking the second contiguous inclined portion of said delivery chute when said delivery station opening door is opened and being in dispensing alignment with the said inclined portion of said delivery chute when said delivery station opening door is closed.

3. The apparatus as defined by claim 2 wherein said blocking means comprises a cylindrically shaped sleeve having a contour compatible with the said first arcuate shaped portion of said delivery chute and having a diameter sufficient to enable a vended cup to pass therethrough.

4. Popcorn vending apparatus, comprising:
   (a) a main enclosure having front, rear, and side walls defining an enlarged compartment, an opening disposed within said front wall providing a delivery station from which vended containers of popped corn can be retrieved;
   (b) cooker assembly means disposed within said enlarged compartment, said cooker assembly means comprising a first housing defining upper and lower horizontally extending chambers in communication with one another by way of a vertically extending chamber; a second housing vertically spaced from said upper chamber and defining therein a heater chamber open at the top and bottom thereof and in flow communication with said lower chamber, heating means being disposed within said heater chamber; a receptacle for retaining uncooked kernel corn disposed intermediate said upper chamber and said heater chamber, said receptacle having screened openings at the top and bottom thereof; means for directing air past said heating means, through said receptacle, and thereafter through said upper, vertically extending, and lower chambers; and means for rotating said receptacle between respective upright and tilted positions, whereby the heated air converts said uncooked kernel corn into a supply of popped corn which is dispensed by gravity from said receptacle when in its tilted position;

(c) kernel corn supply assembly means disposed within said enlarged compartment for delivering a predetermined portion of a larger supply of uncooked kernel corn to the receptacle of said cooker assembly, said kernel corn supply assembly means comprising a hopper retaining said larger supply, corn chute means for conveying uncooked kernel corn to said receptacle, and means for withdrawing said predetermined portion from said larger supply and delivering said predetermined portion to said corn chute means;

(d) container dispenser assembly means disposed within said enlarged compartment for retaining a supply of containers and for dispensing individual ones of said containers; and (e) means defining a single transport path for conveying individual containers from said container dispenser assembly means to said delivery station as well as for directly conveying popped corn dropping from the tilted receptacle of said cooker assembly means to said delivery station, and means for rotating the receptacle to its tilted position subsequent to the conversion of each predetermined portion of uncooked kernel corn in said receptacle to said supply of popped corn and subsequent to the dispensing of an individual container, whereby a container delivered to said delivery station along said single transport path is filled with freshly popped corn.

5. The apparatus as defined in claim 4 wherein said receptacle comprises a transparent globe, lower screen means for supporting the uncooked kernel corn in said receptacle, and upper screen means pivotally mounted to rotate between closed and open positions when said receptacle is in its respective upright and tilted position.

6. The apparatus as defined by claim 5 wherein said upper screen means is pivotally mounted with said receptacle by way of a shaft secured thereto, the said shaft having a weighted end portion facilitating the rotation of said upper screen means between said closed and open positions.

7. Popcorn vending apparatus, comprising:

(a) a main enclosure having front, rear, and side walls defining an enlarged compartment, an opening disposed within said front wall providing a delivery station from which vended containers of popped corn can be retrieved;

(b) cooker assembly means disposed within said enlarged compartment, said cooker assembly means comprising a receptacle for retaining uncooked kernel corn, means for introducing heated air into said receptacle to convert said uncooked kernel corn into a supply of popped corn therein, and means for dispensing said supply of popped corn from said receptacle;

(c) kernel corn supply assembly means disposed within said enlarged compartment for delivering a predetermined portion of a larger supply of uncooked kernel corn to the receptacle of said cooker assembly;

(d) container dispenser assembly means disposed within said enlarged compartment for retaining a supply of containers and for dispensing individual ones of said containers;

(e) means defining a first transport path from said container dispenser assembly means to said delivery station and a second transport path from said cooker assembly means to said delivery station, whereby a container delivered to said delivery station along said first transport path is filled with popped corn delivered along said second transport path from the receptacle of said cooker assembly means; and salt dispenser assembly means for dispensing individual tubes of salt to a second opening within said main enclosure, said salt dispenser assembly comprising a first longitudinally extending plate having a transversely disposed slot at an upper portion thereof; hopper means for retaining a supply of salt tubes at a location below said transversely disposed slot, said hopper being open in a direction facing said first plate; a second longitudinally extending plate mounted intermediate the open portion of said hopper and said first plate, said second plate having a transversely disposed slot therein, said second plate being so oriented with respect to said hopper and said first plate that the reciprocating translation of said second plate enables the transverse slot in said second plate to capture a tube of salt from said hopper when passing in proximity thereto and the registry of the transverse slot in said second plate with the transverse slot of said first plate enables the so-captured salt tube to fall through the transverse slot of said first plate; and means for reciprocating said second plate along said first plate to position the slot in said second plate in proximity with said hopper and in registry with the transverse slot of said first plate.

8. The apparatus as defined by claim 7 further including chute means conveying tubes of salt from said slot in said first plate to said second opening.

9. The apparatus as defined by claim 8 further including spring biased means so positioned to facilitate clearance of salt tubes through said transverse slot of said first plate.

10. The apparatus as defined by claim 1, wherein said flavor dispensing assembly means comprises a dispensing head mounted above said delivery station opening and having a main body defining a fluid passageway with a plurality of tubes defining respective flow channels in fluid communication with said fluid passageway, said tubes respectively including open downwardly directed end portions, whereby butter flavored fluid topping within said passageway is diverted into multiple streams for discharge onto the cup of popped corn at said delivery station opening; said flavor dispenser assembly further comprising motor driven piston pump means in fluid communication with both said supply of topping and the said fluid passageway of said dispensing head for withdrawing said selected quantity of said topping from said supply of topping and discharging said selected quantity through said plurality of tubes.

11. The apparatus as defined by claim 4 further comprising a flavor dispenser assembly for dispensing fluid flavoring to the popped corn within its container at said delivery station, said flavor dispenser assembly comprising a supply of said fluid flavoring; a dispensing head mounted above said delivery station and having a main body defining a fluid passageway with a plurality of these defining respective flow channels in fluid commuication with said fluid passageway, said tubes respectively including open downwardly directed end portions, whereby fluid flavoring within said passageway is diverted into multiple streams for discharge onto the popped corn within said container; and motor driven piston pump means in fluid communication with said supply of fluid flavoring and the fluid passageway of said dispensing head for withdrawing a portion of said fluid flavoring from the said supply of fluid flavoring and discharging said portion through said plurality of tubes.

12. The apparatus as defined by claim 11 wherein said motor piston pump means comprises a main fluid chamber and an operatively associated piston rod reciprocated between a first position whereby said portion of fluid flavoring is withdrawn into said pump chamber and a second position whereby said portion of fluid flavoring is discharged to said dispensing head; and further comprising a crank arm eccentrically driven by said motor to translate said piston rod between said first and second positions; and switch means operatively engaged by said crank arm to interrupt the operation of said motor when said piston rod has been translated to its first position.

13. Popcorn vending apparatus, comprising:
(a) a main enclosure having front, rear, and side walls defining an enlarged compartment, an opening disposed within said front wall providing a delivery station from which vended containers of popped corn can be retrieved;
(b) cooker assembly means disposed within said enlarged compartment, said cooker assembly means comprising a housing defining a plurality of horizontally and vertically extending chambers in flow communication with one another and thereby defining a continuous air flow path; heating means being disposed within said continuous air flow path; a receptacle for retaining uncooked kernel corn, said receptacle, when in its upright position, in flow communication with said continuous air flow path by way of screened openings at the top and bottom thereof; means for directing air heated by said heating means along said continuous air flow path and through said receptacle; and means for rotating said receptacle between respective upright and tilted positions, whereby the heated air converts said uncooked kernel corn into a supply of popped corn which is dispensed by gravity from said receptacle when in its tilted position;
(c) kernel corn supply assembly means disposed within said enlarged compartment for delivering a predetermined portion of a larger supply of uncooked kernel corn to the receptacle of said cooker assembly, said kernel corn supply assembly means comprising a hopper retaining said larger supply, corn chute means for conveying uncooked kernel corn to said receptacle, and means for withdrawing said predetermined portion from said larger supply and delivering said predetermined portion to said corn chute means;
(d) container dispenser assembly means disposed within said enlarged compartment for retaining a supply of containers and for dispensing individual ones of said containers; and
(e) means defining a single transport path for conveying individual containers from said container dispenser assembly means to said delivery station as well as for directly conveying popped corn dropping from the tilted receptacle of said cooker assembly means to said delivery station, and means for rotating the receptacle to its tilted position subsequent to the conversion of each predetermined portion of uncooked kernel corn in said receptacle to said supply of popped corn and subsequent to the dispensing of an individual container, whereby a container delivered to said delivery station along said single transport path is filled with freshly popped corn.

* * * * *

UNITED STATES PATENT AND TRADEMARK OFFICE
CERTIFICATE OF CORRECTION

PATENT NO. : 4,171,667
DATED : Oct. 23, 1979
INVENTOR(S) : Kenneth H. Miller; Ramon W. Wilks It is certified that error appears in the above-identified patent and that said Letters Patent are hereby corrected as shown below:

Column 12, Line 63, "these" should be "tubes"

Signed and Sealed this

Twenty-sixth Day of February 1980

[SEAL]

Attest:

SIDNEY A. DIAMOND

Attesting Officer

Commissioner of Patents and Trademarks